(12) United States Patent
Dumoulin et al.

(10) Patent No.: US 9,644,960 B2
(45) Date of Patent: May 9, 2017

(54) LASER BEAM HORIZONTAL TRUENESS TESTING DEVICE AND CORRESPONDING METHOD

(71) Applicant: LEICA GEOSYSTEMS AG, Heerbrugg (CH)

(72) Inventors: Charles Leopold Elisabeth Dumoulin, Balgach (CH); Marco Petermann, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 60 days.

(21) Appl. No.: 14/649,861

(22) PCT Filed: Dec. 3, 2013

(86) PCT No.: PCT/EP2013/075372
§ 371 (c)(1),
(2) Date: Jun. 4, 2015

(87) PCT Pub. No.: WO2014/086773
PCT Pub. Date: Jun. 12, 2014

(65) Prior Publication Data
US 2015/0308825 A1    Oct. 29, 2015

(30) Foreign Application Priority Data
Dec. 5, 2012 (EP) .................... 12195754

(51) Int. Cl.
*G01C 15/00* (2006.01)
*G01C 9/06* (2006.01)

(52) U.S. Cl.
CPC ............. *G01C 15/008* (2013.01); *G01C 9/06* (2013.01); *G01C 15/006* (2013.01)

(58) Field of Classification Search
CPC ...... G01C 15/006; G01C 15/004; G01C 3/08; G01B 11/14
See application file for complete search history.

(56) References Cited

U.S. PATENT DOCUMENTS

| 5,537,200 A | 7/1996 | Kumagai et al. |
| 8,711,369 B2 | 4/2014 | Campagna |

(Continued)

FOREIGN PATENT DOCUMENTS

| CN | 2465179 Y | 12/2001 |
| CN | 101021411 A | 8/2007 |

(Continued)

OTHER PUBLICATIONS

European Search Report dated May 8, 2013 as received in Application No. 12 19 5754.

*Primary Examiner* — Luke Ratcliffe
(74) *Attorney, Agent, or Firm* — Maschoff Brennan

(57) ABSTRACT

The invention relates to a laser beam horizontal trueness testing device for a laser beam projection device for construction and/or interior design work. The laser beam projection device is equipped with a beam self-leveling functionality. The laser beam horizontal trueness testing device has a telescope with an attenuating filter, a magnifying objective, and a flat image sensor for capturing an image of a laser beam incident on the objective. Components of the laser beam horizontal trueness testing device further include a natural inclination compensator and an analyzing unit which is designed to automatically ascertain an image position of the laser beam captured in the image by processing the image. According to the invention, the flat image sensor is arranged on an image plane of the objective, and the analyzing unit is additionally designed to quantify the laser beam horizontal trueness.

20 Claims, 8 Drawing Sheets

(56) References Cited

U.S. PATENT DOCUMENTS

| | | | |
|---|---|---|---|
| 2006/0072100 A1* | 4/2006 | Yabe | G01C 3/08 |
| | | | 356/4.04 |
| 2011/0090481 A1 | 4/2011 | Snyder | |
| 2011/0235053 A1* | 9/2011 | Campagna | G01C 15/006 |
| | | | 356/614 |
| 2014/0075767 A1 | 3/2014 | Frank et al. | |

FOREIGN PATENT DOCUMENTS

| | | |
|---|---|---|
| CN | 200986436 Y | 12/2007 |
| CN | 102257357 A | 11/2011 |
| EP | 2 199 739 A1 | 6/2010 |
| WO | 2012/104112 A1 | 8/2012 |

\* cited by examiner

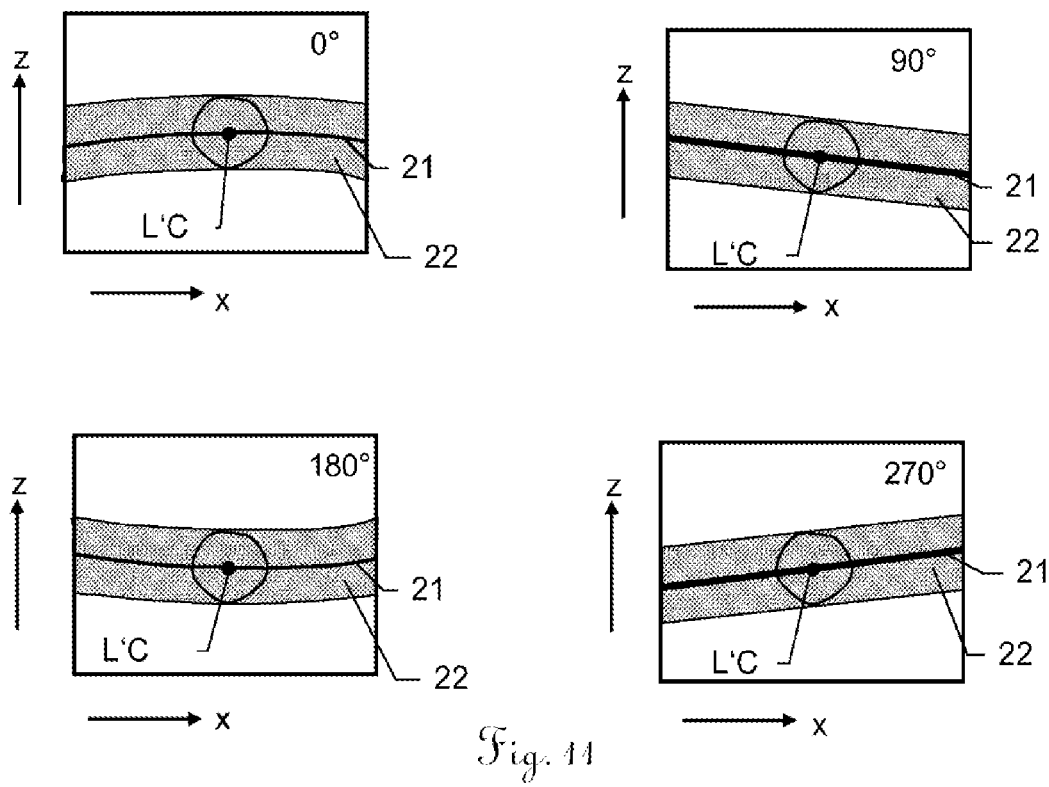
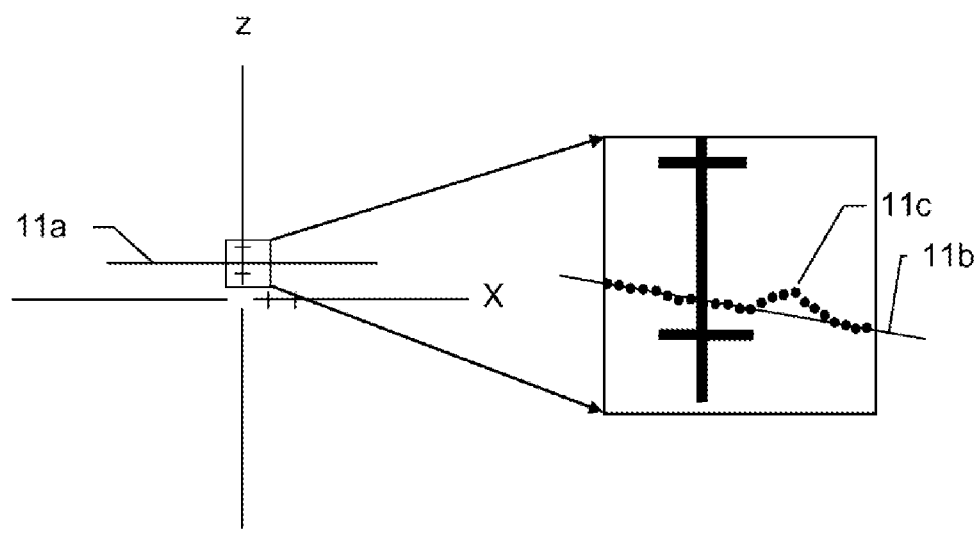
Fig. 11
Fig. 12a    Fig. 12b

LASER BEAM HORIZONTAL TRUENESS TESTING DEVICE AND CORRESPONDING METHOD

FIELD OF THE INVENTION

The invention relates to a laser beam horizontal trueness testing device for a laser beam projection apparatus for construction and/or interior finishing work, wherein the laser beam projection apparatus is equipped with a beam self-leveling functionality. The laser beam projection apparatus is designed in particular as a rotation laser or a line or point laser. The laser beam horizontal trueness testing device comprises a telescope having an attenuation filter, an objective having a magnifying effect, and a planar image sensor for capturing an image from a laser beam incident in the objective. Component parts of the laser beam horizontal trueness testing device additionally include an inherent inclination compensator and an evaluation unit designed for automatically determining an image position of the laser beam captured in the image on the basis of image processing.

BACKGROUND

Laser beam projection apparatuses, such as, for example, point lasers, line lasers or in particular rotation lasers, are used in particular in construction or interior finishing, for example for vertically marking walls. A rotation laser marks a reference plane by means of its rotating laser beam. In this case, the laser beam itself can be emitted for example in a punctiform, linear or fan-shaped fashion. The laser light can be generated as continuous light or in a pulsed fashion. What is important here is that the laser beam is emitted with plane trueness, in particular horizontal trueness, that is to say that it remains exactly in the envisaged plane, in order to be able to preclude incorrect markings. In order to ensure this, conventional lasers of this type are generally equipped with a beam self-leveling functionality. In order to fulfill such a beam self-leveling functionality, various technical solutions are known, which can be of mechanical type and also optical type. By way of example, the laser core module can be suspended in pendulum fashion, such that a horizontal trueness can be produced with use of gravitation. The laser can also be equipped with an inclination sensor, in the simplest case a bubble sensor, for example, the display or signal of which can be read and used as initial variable for an active adjustment of the laser. A first adjustment of the horizontal trueness and calibration of the beam self-leveling functionality are typically carried out by the manufacturer prior to delivery of the laser.

The adjustment of the laser can change, however, as a result of various external influences, such as, for example, temperature and moisture fluctuations, mechanical shocks such as vibrations, etc. Therefore, at regular intervals or as required, it is necessary to test and recalibrate the plane trueness and/or horizontal trueness of the laser and the beam self-leveling functionality thereof and, if appropriate, to readjust the laser.

For fulfilling this task, laser beam horizontal trueness testing devices are known and described in the prior art. These known devices usually comprise, as basic components, a telescope and an inherent inclination compensator, which is intended to ensure that the optical axis of the telescope is always aligned horizontally. This is necessary, of course, in order that the testing device itself can be aligned perfectly horizontally, such that it can actually be used to monitor the horizontal trueness of another apparatus. In one known laser beam horizontal trueness testing device, which will be described in even greater detail below with reference to FIG. 1a, the telescope has an entrance objective having an image plane in which objects situated remotely, i.e. at infinite distance, are imaged. In the continuation direction of the optical axis of the objective, downstream of the image plane, an eyepiece is arranged for an observer, behind which eyepiece for testing the laser beam horizontal trueness of a laser beam projection apparatus, a planar image sensor, typically a camera, is arranged, onto which an incident laser beam is imaged. Usually, the center of the image sensor is arranged on the optical axis of the objective. In front of the objective, a diaphragm having a central light-transmissive opening is fitted on the optical axis of the objective, for example screwed onto the telescope. Such a commercially available testing device is equipped for example with an optical filter fitted in front of the objective, said optical filter being settable in two positions, whereby the intensity incident in the telescope can be reduced in two stages.

Such a commercially available testing device has a series of disadvantages. Firstly, the accuracy achievable therewith when testing the laser beam horizontal trueness of a laser beam projection apparatus is greatly restricted, as will be substantiated in greater detail below. Secondly, carrying out such testing is also complex. A first group of disadvantages is based on the imaging of the laser beam via an eyepiece. An eyepiece usually has only a small diameter and a short focal length, that is to say a great curvature of the lens surface. As a result, considerable optical distortions are inevitably produced over the extent of the field of view, the disturbance being least in the center of the eyepiece. Moreover, an eyepiece is typically arranged displaceably over a certain distance in the axial direction in order to enable an adaptation to the specific properties of an observer's eye. As a result, inevitably only an approximate, but hardly a highly accurate, positioning of the eyepiece is possible. What is particularly disadvantageous for a measurement result is an unintentional tilting of the eyepiece relative to the optical axis of the objective, said tilting occurring relatively easily. This produces an offset of an incident laser beam, which enters the telescope horizontally through the objective and should actually be imaged onto the point of intersection between the optical axis and the planar image sensor, on the image sensor, which then incorrectly indicates a deviation of the laser beam from the horizontal course, which deviation is not actually present at all. Axial movements or incorrect positionings of the eyepiece additionally impair the collimation of the laser beam on the image sensor. In addition, this device is considerably susceptible to vibrations, specifically to a greater extent, the further away from the image plane the image sensor is arranged. This device allows only basic, i.e. "yes-no", checks as to whether a deviation from the horizontal course of the laser beam is present. Any kind of quantification of such a deviation, to say nothing of a more accurate analysis for determining the cause of such a deviation, is not possible with this device. Therefore, when a deviation of the emitted laser light of an examined laser beam projection apparatus from the horizontal is established, this known laser beam horizontal trueness testing device also cannot be used to provide assistance in readjusting the laser beam projection apparatus, rather the latter then typically nevertheless has to be sent in for service by the manufacturer.

Furthermore, such a testing device, in particular owing to the disturbance-susceptible positioning of the eyepiece that carries out imaging onto the image sensor, itself has to be regularly recalibrated and, if appropriate, readjusted, which necessitates service by the manufacturer in the case of such known devices.

In addition to the large number of disadvantages described with regard to the optical measurement accuracy that is achievable, said device for testing the laser beam horizontal trueness of a laser beam projection apparatus is moreover usable only with great effort for an operator. The diaphragm with its central opening that is fitted in front of the optical entrance of the telescope is absolutely necessary for this device in order to make it possible to distinguish a laser beam incidence which deviates from the envisaged horizontal and is to be corrected from a laser beam that actually arrives horizontally, that is to say runs parallel to the optical axis, but runs in a manner perpendicularly offset with respect thereto. This last in the case of said device would likewise lead to an offset of the point of impingement of the laser beam on the image sensor. In this case, it would actually even be advisable to make the dimensioning of the diaphragm opening as small as possible, in order to improve the distinguishability and thus the measurement accuracy of the apparatus. For the use of the apparatus, however, this means that a laser to be tested with regard to its laser beam horizontal trueness has to be aligned with the diaphragm opening very accurately in terms of its optical exit opening for the laser beam, i.e. has to be positioned at the level of the optical axis of the objective in the case of a desired horizontal laser beam path. This means stringent requirements made of a user for an accurate positioning of the laser beam projection apparatus to be tested. This described problem of mutual level setting and alignment is made even more difficult when testing invisible laser beams, for example infrared beams, since the visual monitoring by a user or the visible reference when the apparatus to be tested is set up in front of the telescope is absent in that case.

The known laser beam horizontal trueness testing devices thus not only have an inadequate optical measurement accuracy and only very limited usability and thus only little usefulness of the measurement results obtained with such a device, but also can only be operated with great effort by a user.

SUMMARY

Some embodiments of the present invention overcome these disadvantages. Some embodiments of the invention, in particular, provide an easily operable laser beam horizontal trueness testing device for a laser beam projection apparatus which is equipped with a beam self-leveling functionality.

Some embodiments provide a laser beam horizontal trueness testing device which also enables quantitative measurements of the plane trueness or horizontal trueness of the laser emission and this testing device can preferably be used for any possibly required readjustment of an examined laser beam projection apparatus.

The invention provides a laser beam horizontal trueness testing device for a laser beam projection apparatus for construction and/or interior finishing work, wherein the laser beam projection apparatus is equipped with a beam self-leveling functionality. The laser beam projection apparatus is designed in particular as a rotation laser or a line or point laser. The laser beam horizontal trueness testing device comprises a telescope having an attenuation filter, an objective having a magnifying effect, and a planar image sensor for capturing an image from a laser beam incident in the objective. Component parts of the laser beam horizontal trueness testing device additionally include an inherent inclination compensator and an evaluation unit designed for automatically determining an image position of the laser beam captured in the image on the basis of image processing.

According to the invention, the planar image sensor, provided for example as a CMOS or CCD chip and preferably having light sensitivity not only in the visible spectral range but also in the infrared spectral range, thereby enabling the device to be used with infrared-emitting apparatuses such as total stations, is arranged in an image plane of the objective, and the evaluation unit is additionally designed for carrying out a quantification of the laser beam horizontal trueness with a translation of the determined image position into a laser beam inclination value on the basis of a translation rule related to calibration parameters dependent on a position of the image sensor in the telescope.

In comparison with the prior art, according to the invention the image sensor is arranged in the image plane of the telescope objective. As a result, assuming a horizontal alignment of the laser beam horizontal trueness testing device itself, any horizontally arriving laser beam, even if it arrives parallel to the optical axis of the objective but with an offset perpendicular thereto, is imaged onto the image sensor on the optical axis, provided that it is detected within the aperture and by the objective of the telescope. Therefore, the telescope with its objective is designed in a diaphragm-free fashion, such that the entire or at least a large region of the cross-sectional area of the objective is usable as aperture.

Thus, it is merely still necessary to align the laser beam with the aperture of the objective, but no longer necessary to strike a more or less small opening of a diaphragm attached beforehand by screwing, which considerably reduces the required effort for positioning a laser beam projection apparatus to be tested.

The laser beam is imaged directly via the objective onto the image sensor in the image plane, without any intervening intermediate image plane and eyepiece. This overcomes all problems associated with an accurate positioning of an eyepiece that is necessary for a satisfactory measurement accuracy, and likewise a disturbance susceptibility toward vibrations.

The specific features according to the invention enable a quantification of the laser beam horizontal trueness with a translation of the determined image position into a laser beam inclination value on the basis of a translation rule related to calibration parameters dependent on a position of the image sensor in the telescope.

The last-mentioned additional features of the evaluation unit advantageously make it possible, in contrast to the prior art, to quantify the extent of a deviation of a laser beam from horizontal trueness and even also, in particular on the basis of the quantitative type of deviation data ascertained, to obtain therefrom indications for a diagnosis and identification of the cause of such deviations and, if appropriate, to enable a testing of a readjustment of the laser by the user himself/herself.

In accordance with one embodiment of the laser beam horizontal trueness testing device according to the invention, the attenuation filter is designed in such a way that a multiplicity of different degrees of attenuation are provided, from which a respective degree of attenuation is selectable and settable on the part of the user, or a degree of attenuation is automatically selected and caused to be set by evaluation of a test image captured from the laser beam incident in the objective. Preferably, the attenuation filter is designed in such a way that a respective degree of attenuation is selectable and settable continuously variably in a wide degree-of-attenuation range. In this case, it is particularly advantageous if the attenuation filter has at least one rotatably arranged linear polarizer, specifically two or more linear polarizers arranged rotatably relative to one another. In the case of a linearly polarized laser radiation to be detected, just a single linear polarizer suffices to set the widest possible attenuation range, between 0% (parallel polarization) and 100% (crossed polarization). Furthermore, it is preferred for the attenuation filter to extend substantially uniformly over an entire objective cross-sectional area as aperture.

Advantageously, the telescope is designed in a diaphragm-free fashion, and the image sensor and the objective are arranged in a cooperating fashion in the telescope, in such a way that an incident laser beam is detectable by the image sensor over at least a wide part of the objective cross-sectional area as aperture, in particular substantially over the entire objective cross-sectional area.

The inherent inclination compensator of the laser beam horizontal trueness testing device according to the invention can be designed for example as an optomechanical self-leveler having an optomechanical element, in a simple case e.g. as a bubble sensor or vial, for the self-leveling of the optical axis of the telescope, said optomechanical element being arranged in the beam path of the telescope between the objective and the image sensor, or as an electronic inclination considerer having a high-precision inclination sensor for ascertaining a telescope inclination value dependent on a current inclination position of the telescope, wherein the telescope inclination value is automatically taken into consideration by the evaluation unit in an automatically conducted translation of the image position into a laser beam inclination value.

In accordance with one possible embodiment of the invention, a focusing element disposed downstream of the objective in the beam path is additionally provided in the telescope, said focusing element being axially adjustable.

In accordance with a further embodiment, the telescope has a beam splitter arranged in the beam path and serving for splitting the beam path into a first channel and a second channel in such a way that a first image plane of the objective is produced in the first channel and a second image plane of the objective is produced in the second channel. In this case, the image sensor is arranged in the first image plane, and an optical unit carrying an indicator for the optical axis, in particular with a reticle, and an eyepiece disposed downstream of said optical unit and serving for a user's eye to view the intermediate image generated in the second image plane are arranged in the second image plane. For this embodiment, the exact adjustment of the indicator or reticle in the second image plane should typically be performed by the manufacturer, wherein generally a later readjustment is not necessary owing to the fixed positioning within the telescope in a manner not susceptible to disturbances. The positioning of the image sensor in the first image plane is not susceptible to disturbances either, and so typically after a first adjustment and calibration of the apparatus by the manufacturer, subsequent adjustments and calibrations are no longer necessary.

Calibration parameters stored in the evaluation unit represent e.g. the imaging position of the optical axis of the objective in the image and, in particular, a direction in the image which represents an offset direction—brought about hypothetically by a pure horizontality error—of a laser beam impingement position on the image sensor.

For the translation of the determined image position into a laser beam inclination value, preferably a distance is ascertained which is present in the image between the image position and the imaging position in that direction which is assumed as direction or is stored in the calibration parameters and which represents an offset direction—brought about hypothetically by a pure horizontality error—of a laser beam impingement position on the image sensor. Said distance—in particular in accordance with a translation factor defined by the objective imaging ratio—can be translated into the laser beam inclination value.

In accordance with a further embodiment of the invention, a pattern, in particular a stencil, is in each case stored for different laser beam cross-sectional shapes in a memory retrievably for the evaluation unit. Furthermore, in accordance with this embodiment, a pattern corresponding to the laser beam cross-sectional shape of the incident laser beam is selectable on the part of the user or is automatically selected by image processing with feature recognition. In this case, by means of the evaluation unit when determining the image position, the selected pattern is matched on the basis of a best fit method in the image with the captured laser beam, in particular with subpixel accuracy, and on the basis of the matched position of the pattern in the image, the image position of the laser beam captured in the image is ascertained. The invention makes it possible that this can be carried out in particular with subpixel accuracy, wherein in particular information is concomitantly stored for each stored pattern, which information allows the derivation of a pattern-internally defined pattern position to be used for the ultimate determination of the image position within the pattern. Specifically in this case the information is the pattern-internally defined pattern position or a defined pattern position ascertaining algorithm such as a pattern centroid ascertaining algorithm.

In accordance with a further embodiment, the laser beam horizontal trueness testing device according to the invention furthermore has a functionality for testing a laser beam inclination trueness especially for a laser beam projection apparatus which is designed in this way and which has a beam inclination function with desired inclination for the laser beam, said desired inclination being selectable in a defined manner on the part of the user and settable—in particular optionally automatically—. This relates in particular to a laser beam projection apparatus designed as an inclination rotation laser with an automatic single- or dual-slope mechanism. In this case, according to the invention, in the context of the functionality for testing the laser beam inclination trueness, after the setting of the defined desired inclination for the laser beam at the laser beam projection apparatus, a capture—carried out by the image sensor—of an image from the laser beam incident in the objective is triggerable and the evaluation unit automatically carries out the following steps:

a determination of an image position of the laser beam captured in the image, and
  a quantification of the laser beam inclination trueness with a translation of the determined image position into a laser beam inclination value on the basis of a translation rule dependent on the stored calibration parameters, such that the laser beam inclination value obtained in this case is comparable with the desired inclination set in a defined manner at the laser beam projection apparatus.

In accordance with a further embodiment of the laser beam horizontal trueness testing device according to the invention, the evaluation unit is designed as a control and evaluation unit and a functionality for testing the laser beam horizontal trueness is provided, said functionality proceeding totally automatically after triggering, in the context of which, under the control of the control and evaluation unit, a capture—carried out by the image sensor—of an image from the laser beam incident in the objective is automatically initiated and carrying out the determination and the quantification is subsequently started automatically. In this case, in particular the functionalities for testing the laser beam azimuth trueness and respectively the laser beam inclination trueness are also provided as functionalities proceeding totally automatically after triggering and, under the control of the control and evaluation unit, a capture—carried out by the image sensor—of an image from the laser beam incident in the objective is automatically initiated and carrying out the determination and the quantification is subsequently started automatically.

A further subject of the invention is a system comprising a laser beam horizontal trueness testing device according to the invention and a laser beam projection apparatus having a beam self-leveling functionality for construction and/or interior finishing work, in particular a rotation laser or line or point laser, in particular wherein the laser beam horizontal trueness testing device and the laser beam projection apparatus in each case comprise a data communication interface, and wherein the laser beam horizontal trueness testing device is designed for generating data dependent on the laser beam inclination value and for communicating said data to the laser beam projection apparatus, such that the beam leveling functionality, in particular beam self-leveling functionality, of the laser beam projection apparatus is recalibratable on the basis of these data obtained, in particular wherein the laser beam projection apparatus is designed for self-acting automatic recalibration of its beam leveling functionality, in particular beam self-leveling functionality, on the basis of these data obtained.

A further subject of the invention is a method for testing the laser beam horizontal trueness of a laser beam projection apparatus having a beam self-leveling functionality and designed for construction and/or interior finishing work, in particular a rotation laser or line or point laser, wherein the method is carried out by a telescope comprising
- an attenuation filter,
- an objective having a magnifying effect, and
- a planar image sensor arranged in an image plane of the objective and serving for detecting an image from a laser beam incident in the objective, and wherein the method involves
- compensating for an inclination of the telescope,
- capturing an image from a laser beam incident in the objective,
- determining an image position of the laser beam captured in the image on the basis of image processing, and
- quantifying the laser beam horizontal trueness by means of translating the determined image position into a laser beam inclination value on the basis of a translation rule related to calibration parameters dependent on a position of the camera or the image sensor in the telescope.

In this case, the developments and specific features of the invention mentioned in connection with the device are analogously also applicable to the method according to the invention.

BRIEF DESCRIPTION OF THE DRAWINGS

The device according to the invention and the method according to the invention are in this case furthermore described in greater detail purely by way of example below on the basis of concrete exemplary embodiments illustrated schematically in the drawings, further advantages of the invention also being discussed. Specifically in the figures:

FIG. 11 shows an example of detections of horizontality deviations produced with the aid of the arrangement illustrated in FIG. 9a, FIGS. 12a-b show an example of quantitative measurement results for a measurement according to the invention of a rotating laser, and FIGS. 13a-b in each case show an example of real quantitative measurement results for a measurement according to the invention of a rotating laser.

DETAILED DESCRIPTION

Figure 1A:
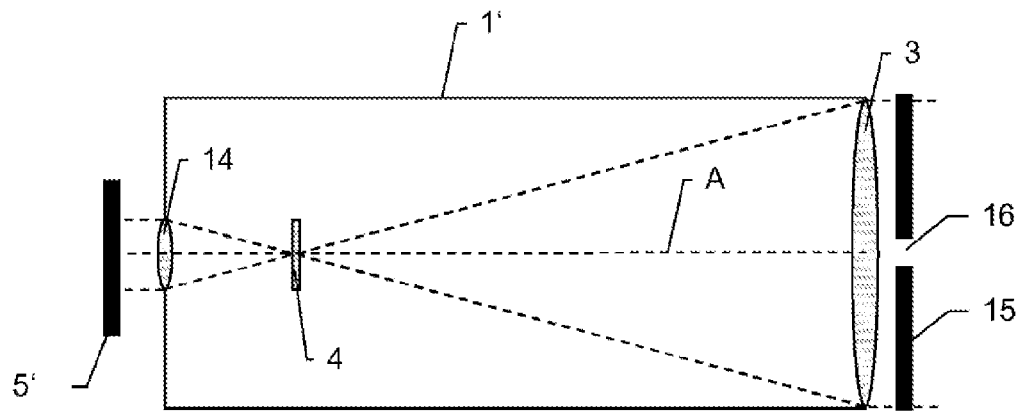
FIGS. 1a-1b show a laser beam horizontal trueness testing device and two known embodiments of laser beam projection apparatuses according to the prior art.

FIG. 1a shows a laser beam horizontal trueness testing device 10' according to the prior art. The device 10' comprises a telescope 1' having an objective 3 having an image plane 4 in which objects situated remotely, i.e. at infinite distance, are imaged. In the continuation direction of the optical axis A of the objective 3, downstream of the image plane 4, an eyepiece 14 is arranged for an observer, behind which eyepiece for testing the laser beam horizontal trueness of a laser beam projection apparatus, in particular of a rotation laser or line or point laser, a planar image sensor 5', typically a camera, is arranged, onto which an incident laser beam is imaged. Usually, the center of the image sensor 5' is arranged on the optical axis. In front of the objective 3, a diaphragm 15 having a very small, central light-transmissive opening 16 is fitted on the optical axis A of the objective 3, for example screwed onto the telescope 1'. Usually, a laser beam horizontal trueness testing device according to the prior art additionally comprises an inherent inclination compensator (not illustrated here), which is intended to ensure that the optical axis A is always horizontally aligned even in the event of slightly inclined installation of the telescope.

Such a testing device, such as is commercially available, is associated with a series of disadvantages. Firstly, the accuracy achievable therewith when testing the laser beam horizontal trueness of a laser beam projection apparatus is greatly restricted, as will be substantiated in greater detail below. Secondly, carrying out such testing is also complex. A first group of disadvantages is based on the imaging of the laser beam via an eyepiece. An eyepiece usually has only a small diameter and a short focal length, that is to say a great curvature of the lens surface. As a result, considerable optical distortions are inevitably produced over the extent of the field of view, the disturbance being least in the center of the eyepiece. Moreover, an eyepiece is typically arranged displaceably over a certain distance in the axial direction in order to enable an adaptation to the specific properties of an observer's eye. As a result, inevitably only an approximate, but hardly a highly accurate, positioning of the eyepiece or position keeping trueness during the use of the eyepiece is possible. What is particularly disadvantageous for a measurement result is the susceptibility of the telescope with regard to an unintentional tilting of the eyepiece relative to the optical axis A during the use of the telescope. This produces an offset of an incident laser beam, which enters the telescope horizontally through the objective and should actually be imaged onto the point of intersection between the optical axis A and the planar image sensor 5', on the image sensor 5', which then incorrectly indicates a deviation of the laser beam from the horizontal course, which deviation is not actually present at all. Axial movements or incorrect positionings of the eyepiece additionally impair the collimation of the laser beam on the image sensor. In addition, this device is considerably susceptible to vibrations, specifically to a greater extent, the further away from the image plane 4 the image sensor 5' is arranged. This device allows only basic, i.e. rather than gradual checks. It is therefore possible only to establish whether or not a deviation from the horizontal course of the laser beam is present. Any kind of quantification of such a deviation from the horizontal incidence of a laser beam, to say nothing of a more accurate analysis for determining the cause of such a deviation, is not possible with this device.

In addition to the large number of disadvantages described with regard to the optical measurement accuracy that is achievable, said device for testing the laser beam horizontal trueness of a laser beam projection apparatus is moreover usable only with great effort for an operator. The diaphragm 15 with its central opening 16, the dimensioning of which is very small owing to technical dictates, that is fitted in front of the optical entrance of the telescope 1' is absolutely necessary for this device in order to make it possible to distinguish a laser beam whose propagation direction deviates from the envisaged horizontal from a laser beam which is actually horizontal but runs in a manner offset in terms of height (that is to say parallel perpendicularly) with respect to the optical axis A. This last in the case of this device would likewise lead to an offset of the point of impingement of the laser beam on the image sensor 5'. Consequently, in the case of this device from the prior art it is advisable to make the dimensioning of said opening 16 as small as possible in order to be able preclude a height offset of incident laser beam and optical axis A and thus actually to enable an unambiguous measurability of a laser beam whose propagation direction deviates from the envisaged horizontal. For the use of the apparatus, however, this means that a laser to be tested with regard to its laser beam horizontal trueness has to be aligned with the diaphragm opening 16 very accurately in terms of its optical exit opening for the laser beam, i.e. has to be positioned at the level of the optical axis A in the case of a desired horizontal laser beam path. This means stringent requirements made of a user and high expenditure of time for an accurate positioning of the laser beam projection apparatus to be tested relate to the telescope.

Figure 1B:
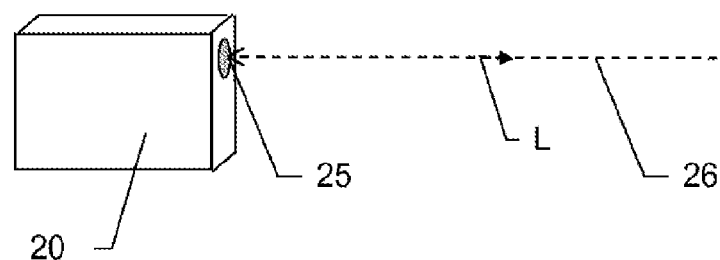

FIG. 1*b* shows two known embodiments of laser beam projection apparatuses 20, each provided with a laser beam exit opening 25, for emitting a horizontal, collimated laser beam L as point 27 on a projection surface, or a horizontal laser beam fan for generating a horizontal line on a projection surface. Further embodiments of laser beam projection apparatuses measurable for a measurement by means of the laser beam horizontal trueness testing device according to the invention, such as, in particular, rotation lasers as well, are likewise known and sufficiently described in the prior art. Such laser beam projection apparatuses in each case have, in a known manner, mechanisms for providing a self-leveling functionality which ensure that, despite a slightly inclined installation of the apparatus (e.g. approximately in the range of +−5° inclination about the horizontal), the laser beam is nevertheless emitted in the horizontal direction. Moreover, such laser beam projection apparatuses having self-leveling functionality also include channel construction lasers as point lasers. The device concerning the invention is now designed and provided exactly for testing, in the case of such laser beam projection apparatus, how true the mechanism for self-leveling actually is or what direction deviations of the emitted laser beam from the true horizontal are actually present.

Figure 2:
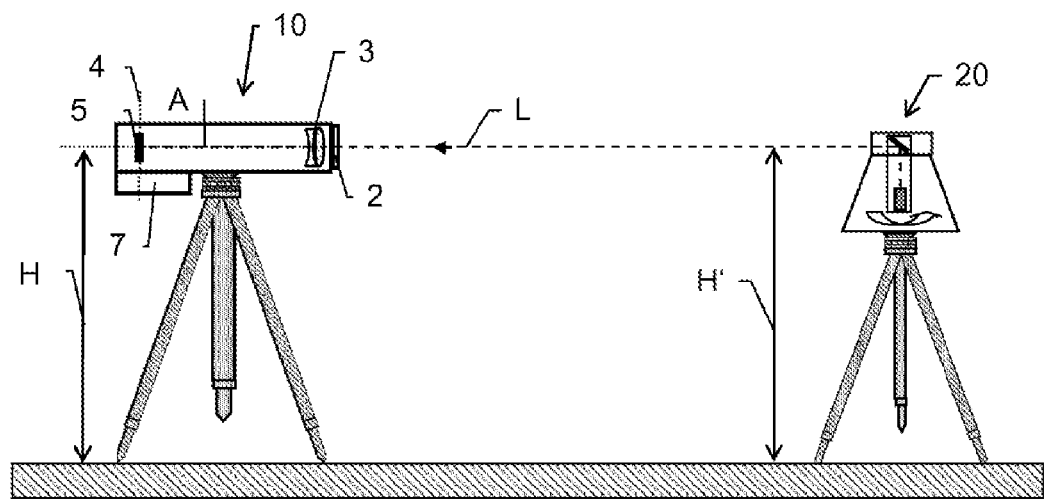
FIG. 2 shows a schematic overview illustration of a laser beam horizontal trueness testing device according to the invention in use when testing the laser beam horizontal trueness of a laser beam projection apparatus.

FIG. 2 shows a schematic overview illustration of a laser beam horizontal trueness testing device 10 according to the invention in use when testing the laser beam horizontal trueness of a laser beam projection apparatus 20. The laser beam L emerges from the laser beam projection apparatus 20 at a height H' above the supporting base. The optical axis A of the testing device 10 is situated at a height H above the supporting base.

In this schematically illustrated example, the optical axis A and the course of the laser beam L coincide. However, this need not be the case for a laser beam horizontal trueness testing device according to the invention, and, in particular, the heights H and H' need not be of identical magnitude (as explained in greater detail again further below).

In the example illustrated, both the laser beam horizontal trueness testing device 10 according to the invention and the laser beam projection apparatus 20, designed as a rotation laser, are mounted in each case on a tripod. The following are illustrated as essential components of the testing device 10: an attenuation filter 2 at the optical entrance of the telescope 1, in front of the objective 3, which defines an optical axis A, a planar image sensor 5 arranged in an image plane 4, an inherent inclination compensator (described in greater detail only with reference to the following figures) and an evaluation unit 7 assigned to the testing device 10. In this case, in contrast to the illustration here and also in the following examples, the evaluation unit need not be connected directly in physical contact with the telescope 1. The image sensor can be designed for example as a CMOS chip or CCD chip or PSD chip (such as a camera) and is preferably light-sensitive not only in the visible spectral range but also in the infrared spectral range, such that a measurement of infrared-emitting lasers is also made possible.

Figure 1B:
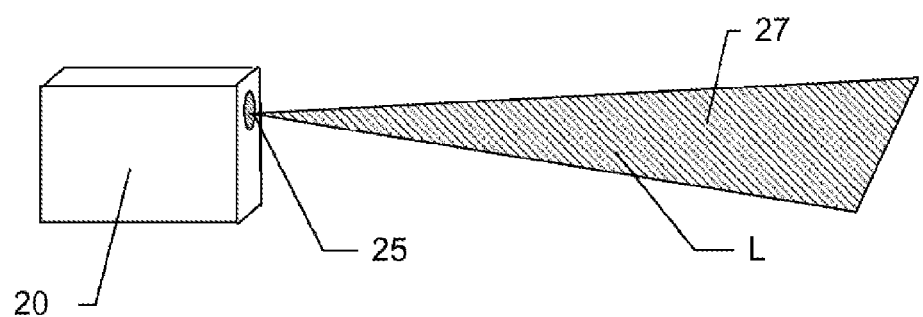

In comparison with the prior art illustrated previously with reference to FIG. 1, the image sensor 5 here according to the invention is arranged in the image plane 4 and the focus is set or settable (or the image sensor 5 is positioned relative to the objective 3 depending on the focal length thereof) in such a way that beams running parallel to one another and incident in the objective coincide and are imaged over the entire aperture of the objective in each case at the same point on the image plane and are thus detected by the image sensor in a single, identical pixel (which therefore then precisely represents a direction of incidence).

What is brought about as a result is that every laser beam L arriving truly horizontally is imaged onto the image sensor 5 on the same point (or at least on the same line taking azimuth direction fluctuations into consideration), even if it arrives with a perpendicular offset with respect to the optical axis A. Therefore, the telescope 1 with its objective 3 is designed in a diaphragm-free fashion, such that the entire or at least a large region of the cross-sectional area of the objective 3 is usable as aperture.

Thus, it is merely still necessary to align the laser beam L with the aperture of the objective 3, but not with a considerably smaller opening of a diaphragm attached by screwing, which considerably reduces the required effort for positioning a laser beam projection apparatus 20 to be tested.

The laser beam L is imaged directly via the objective 3 onto the image sensor 5 in the image plane 4, without any intervening intermediate image plane and eyepiece. This additionally overcomes all problems associated with an accurate positioning and positional stability of an eyepiece that is necessary for a satisfactory measurement accuracy, and likewise a disturbance susceptibility toward vibrations.

Figure 3:
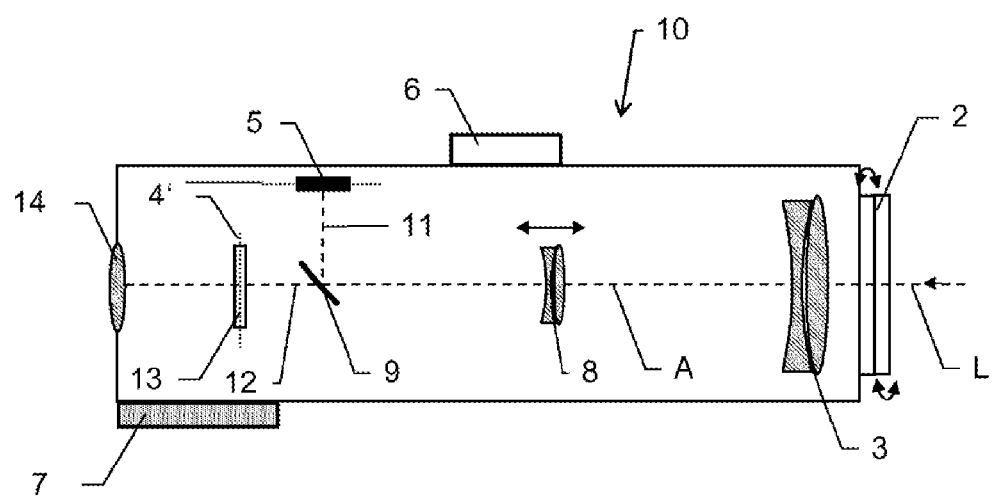
FIG. 3 shows one embodiment of a laser beam horizontal trueness testing device according to the invention.

FIG. 3 shows one possible embodiment of a laser beam horizontal trueness testing device 10 according to the invention, such as was illustrated with essential basic component parts in FIG. 2, for a laser beam projection apparatus for construction and/or interior finishing work, wherein the laser beam projection apparatus is equipped with a beam self-leveling functionality. The laser beam horizontal trueness testing device 10 again comprises a telescope 1 having an attenuation filter 2, an objective 3 having a magnifying effect, and a planar image sensor 5 for capturing an image from a laser beam L incident in the objective 3. Component parts of the laser beam horizontal trueness testing device 10 additionally include an inherent inclination compensator 6 and an evaluation unit 7 designed for automatically determining an image position of the laser beam L captured in the image on the basis of image processing. According to the invention, the planar image sensor 5, is in turn arranged in an image plane 4 of the objective 3, and the evaluation unit 7 is additionally designed according to the invention for carrying out a quantification of the laser beam horizontal trueness with a translation of the determined image position into a laser beam inclination value on the basis of a translation rule related to calibration parameters dependent on a position of the image sensor 5 in the telescope 1.

The last-mentioned additional features of the evaluation unit 7 advantageously make it possible, in contrast to the prior art, to quantify the extent of a deviation of a laser beam from horizontal trueness and even also, in particular on the basis of the quantitative type of deviation data ascertained, to obtain therefrom indications for a diagnosis and identification of the cause of such deviations. This will also be demonstrated below in a further example, carried out experimentally.

In accordance with the embodiment shown in FIG. 3 of the laser beam horizontal trueness testing device 10 according to the invention, the attenuation filter 2 is designed in such a way that a multiplicity of different degrees of attenuation are provided, from which a respective degree of attenuation is selectable and settable on the part of the user, or a degree of attenuation is automatically selected and caused to be set by evaluation of a test image captured from the laser beam L incident in the objective 3. Preferably, the attenuation filter 2 is designed in such a way that a respective degree of attenuation is selectable and settable continuously variably in a wide degree-of-attenuation range. In this case, in particular, the attenuation filter 2 has at least one rotatably arranged linear polarizer, specifically two or more linear polarizers (indicated by a double-headed arrow in FIG. 3) arranged rotatably relative to one another. In the case where the laser radiation to be detected is already present in linearly polarized fashion, just one linear polarizer suffices to set the widest possible degree of attenuation range, i.e. between 0% (parallel polarization) and 100% (crossed polarization). Furthermore, it is preferred for the attenuation filter 2 to extend substantially uniformly over the entire objective cross-sectional area as aperture.

In addition to the arrangement in accordance with FIG. 2, in accordance with the embodiment illustrated in FIG. 3, a focusing element 8 disposed downstream of the objective 3 in the beam path is provided in the telescope 1, which focusing element is axially adjustable and for which focusing element a specific defined focus position can be stored in the calibration parameters, for which focus position it holds true that beams running parallel to one another and incident in the objective coincide and are imaged—over the entire aperture of the objective independently of an aperture impingement location—in each case at the same single point on the image plane and are thus detected by the image sensor in a single, identical pixel.

Moreover, in accordance with this embodiment, the telescope 1 has a beam splitter 9 arranged in the beam path and serving for splitting the beam path into a first channel 11 and a second channel 12 in such a way that a first image plane 4 of the objective 3 is produced in the first channel 11 and a second image plane 4' of the objective 3 is produced in the second channel 12. In this case, the image sensor 5 is arranged in the first image plane 4, and an optical unit 13 carrying an indicator for the optical axis A, in particular with a reticle, and an eyepiece 14 disposed downstream of said optical unit 13 and serving for a user's eye to view the intermediate image generated in the second image plane 4' are arranged in the second image plane 4'.

As inherent inclination compensator, in this case, for example, an electronic inclination considerer having a high-precision inclination sensor 6 can be used for ascertaining a telescope inclination value dependent on a current inclination position of the telescope 1. The telescope inclination value is then automatically taken into consideration by the evaluation unit 7 in an automatically conducted translation of the image position into a laser beam inclination value.

Figure 4:
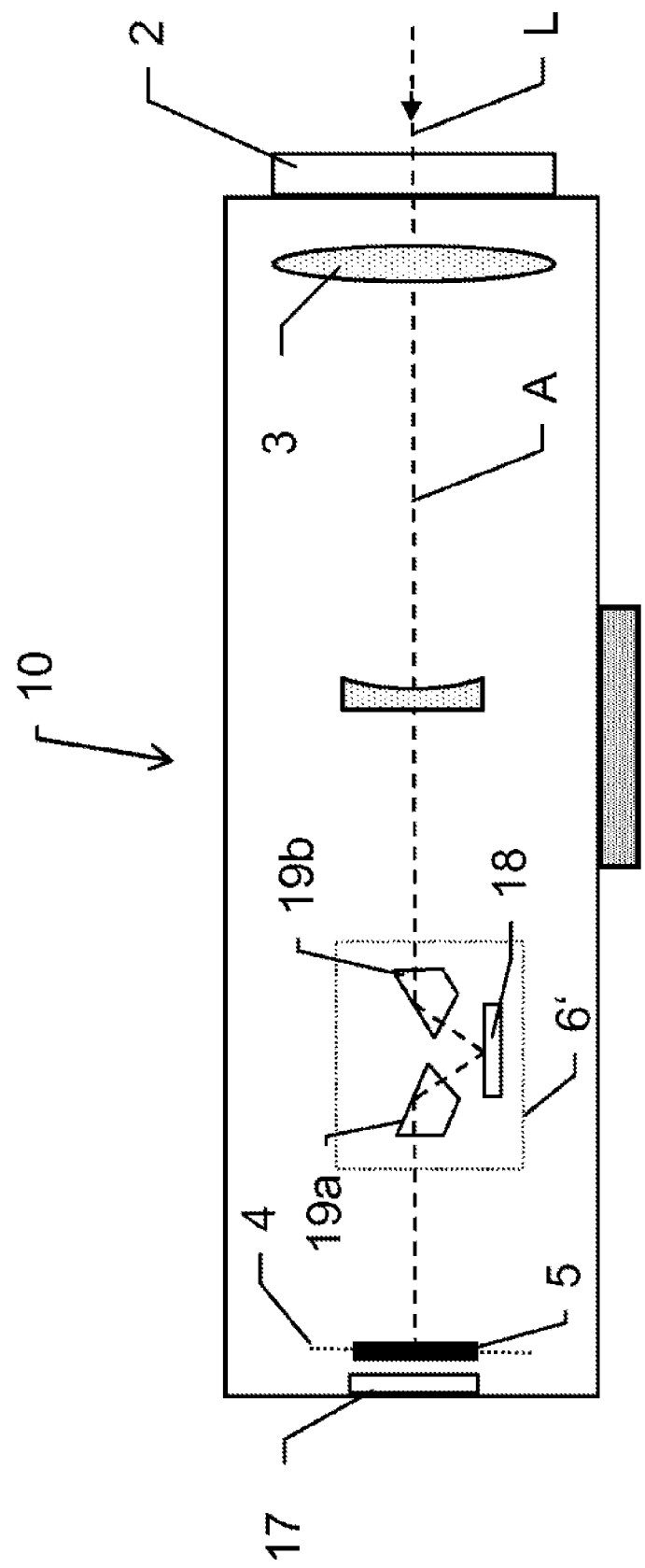
FIG. 4 shows a further embodiment of a laser beam horizontal trueness testing device according to the invention.

FIG. 4 shows a further embodiment of a laser beam horizontal trueness testing device 10 according to the invention, wherein the inherent inclination compensator—as known per se in the prior art—is designed as an optomechanical self-leveler 6' having an optomechanical element for the self-leveling of the optical axis A of the telescope 1, said optomechanical element being arranged in the beam path of the telescope 1 between the objective 3 and the image sensor 5. The image sensor 5 is again arranged in the image plane 4. In accordance with this embodiment, the leveling of the laser beam horizontal trueness testing device 10 is based on an alignment of the beam path in the telescope 1 by means of reflective components 18, 19a, 19b, for example designed as mirrors or prisms, which are part of the self-leveler 6'. Specifically, two components 19a, 19b succeeding one another along the optical axis A are arranged fixedly substantially along the optical axis and the reflective component 18 is arranged rotatably relative to the direction of the optical axis A in order to enable a self-leveling—based on optical signals—of the laser beam horizontal trueness testing device 10. Optionally, the image of the laser beam L is displayed on a micro-display 17, which is viewable if appropriate through an eyepiece (not illustrated here), or a touchscreen (e.g. either arranged directly on the telescope or arranged on a separate control and evaluation unit with user interface).

Figure 5:
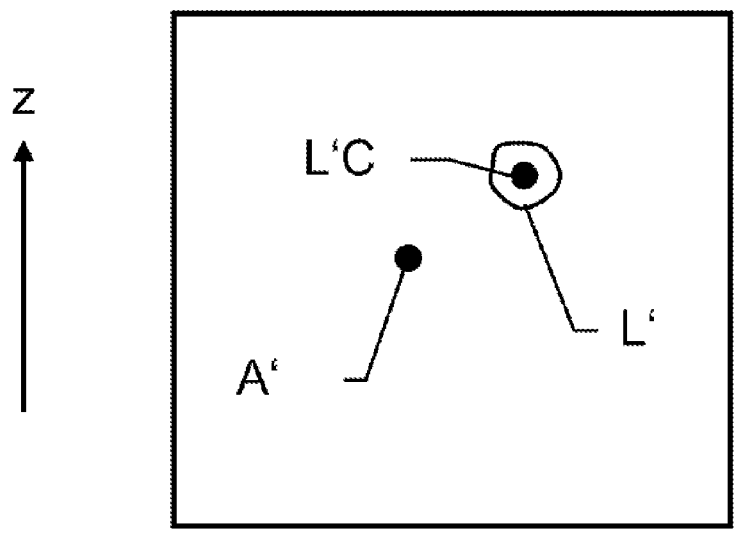
FIG. 5 shows a form of representation of image data of the laser beam.
Figure 6:
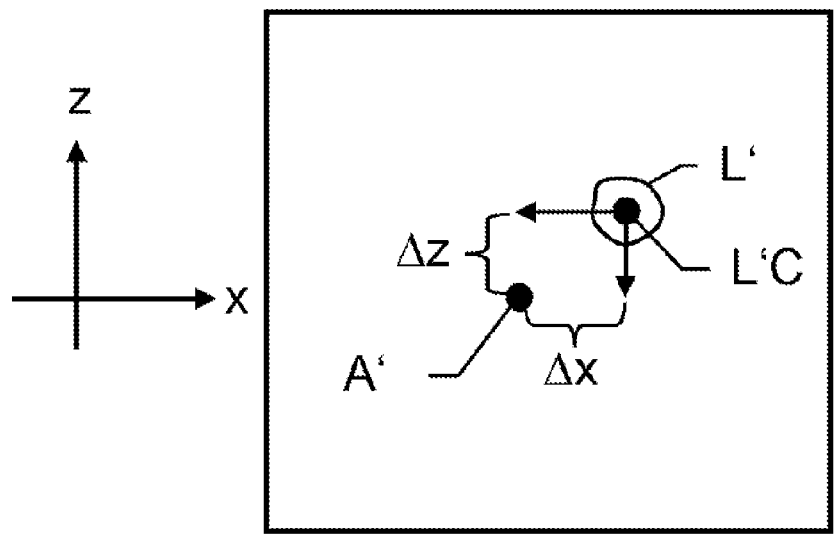
FIG. 6 shows one example of the processing of image data of the laser beam.

FIGS. 5 and 6 show possible forms of representation of the captured image of the laser beam L. FIG. 5 reveals an imaging L' of the laser beam L with a (central) image position L'C determined therefor, and a fictitious imaging A' as a calibrated imaging position of the optical axis A of the objective 3. In addition, a direction Z is illustrated, which indicates by way of example that calibrated direction in the image which represents an offset direction—brought about hypothetically by a pure horizontality error—of a laser beam impingement position on the image sensor.

On the basis of this captured image (that is to say on the basis of the image data), by means of image processing the imaging L' of the laser beam L can then be evaluated with regard to a punctiform central image position of the spot L'; e.g. by centroid formation or by the following method:

- image-positionally matching with the spot L' a selected pattern, which corresponds to the shape of the spot L', on the basis of a best fit method in the image, in particular with subpixel accuracy, and
- ascertaining the image position L'C on the basis of the matched position of the pattern in the image, likewise in particular with subpixel accuracy.

In this case, in this method, information can in particular be concomitantly stored for each stored pattern, which information allows the derivation of a pattern-internally defined pattern position to be used for the ultimate determination of the image position L'C within the pattern, specifically wherein the information is the pattern-internally defined pattern position itself or a defined pattern position ascertaining algorithm such as a pattern centroid ascertaining algorithm.

This determined image position L'C can then be evaluated—using the information about the imaging position of the optical axis A of the objective 3 and about the direction Z, said information being stored in the calibration parameters—with regard to a direction of incidence of the laser beam, in particular with regard to a pure inclination value of the laser beam.

For this purpose, the (pixel) distance—present in the image—between the image position L'C and the imaging position of the optical axis A is ascertained and this distance is projected fictitiously onto the calibrated direction Z (cf. scalar product from mathematics). That component ΔZ of the ascertained distance which is projected onto said direction Z then directly represents a direction deviation of the incident laser beam from the horizontal, such that this component can be translated into an inclination value for the laser beam.

To summarize, therefore, for the translation of the image position L'C, a distance ΔZ is ascertained which is present in the image between the image position L'C and the imaging position A' in that direction Z which is assumed as direction or is stored in the calibration parameters and which represents an offset direction—brought about hypothetically by a pure horizontality error—of a laser beam impingement position on the image sensor. Said distance—in particular in accordance with a translation factor defined by the objective imaging ratio—is then finally translated into the laser beam inclination value.

As an alternative to the case where information about the imaging position A' of the optical axis A of the objective 3 and about the direction Z is stored in the calibration parameters, for example it is also possible to store a zero inclination line—in particular running substantially horizontally over the entire image region in the image—in the image. Said zero inclination line indicates in which (pixel) positions on the image sensor beams which are incident in each case with a slightly varying azimuthal direction, but in each case strictly horizontally, are imaged. This calibrated line in this case, as explained initially on account of the arrangement of the image sensor in the image plane, according to the invention is even independent of respective entrance locations into the aperture of the objective.

Using such calibration parameters, a distance present in the image between the image position L'C and the calibrated zero inclination line can then be ascertained for the translation of the image position L'C. Said distance is then translated directly—in particular once again in accordance with a translation factor defined by the objective imaging ratio—into the laser beam inclination value.

As a further alternative, a preprocessed look-up table can also be stored directly as calibration parameters, from which look-up table an assigned laser beam inclination value is stored directly for respective image positions.

Using such calibration parameters, the laser beam inclination value assigned to the determined image position L'C in the look-up table can then be read out directly for the translation of the image position L'C.

For all cases here the laser beam inclination value can be output for example as inclination angle of the laser beam (e.g. in degrees/minutes/seconds or percent gradient).

FIG. 6 illustrates a possible further processing of the image data in accordance with FIG. 5, wherein the image position L'C can be additionally evaluated with regard to an azimuthal direction of incidence.

This evaluation possibility may be relevant, in particular, for an additional testing of an azimuthal direction trueness of an emitted laser beam, for example from a total station or a laser tracker as laser beam projection apparatus designed as a point laser.

One possible procedure in this case may be that in a first position (face 1) of the beam directing unit of total station/laser tracker, a first azimuthal direction value for the laser beam is determined, the beam directing unit of total station/laser tracker is then turned over into the second position (face 2), in which case, therefore, the beam directing unit—in a manner known per se to the person skilled in the art—is pivoted through exactly 180° in each case in the two rotation axes, and in this second position (face 2) of the beam directing unit of total station/laser tracker, a second azimuthal direction value for the laser beam is determined once again with the aid of the testing device according to the invention.

A difference between first and second azimuthal direction values ascertained can then be used for establishing and quantifying an azimuthal direction error and thus the azimuthal direction trueness of the laser beam of the total station or of the laser tracker.

Additionally for this functionality for testing a laser beam azimuth trueness, in this case a capture—carried out by the image sensor—of an image from the laser beam incident in the objective is triggered and the evaluation unit automatically carries out a determination of an image position L'C of the spot L'—present in the image—of the detected laser beam (wherein this can be carried out precisely analogously to the descriptions mentioned above in association with FIG. 5), and a quantification of the laser beam azimuth trueness with a translation of the determined image position L'C into a laser beam azimuthal direction value on the basis of a translation rule dependent on the stored calibration parameters.

For this purpose, the following information can be stored as calibration parameters (in addition to the information mentioned in connection with FIG. 5):

an imaging position A' of the optical axis in the image and, in particular, a direction X in the image, which represents an offset direction—brought about hypothetically by a pure azimuthal direction deviation from the optical axis—of a laser beam impingement position on the image sensor (this option is shown here in FIG. 6), a zero azimuthal deviation line—in particular running substantially vertically over the entire image region in the image—in the image (wherein line indicates in which (pixel) positions on the image sensor beams which are incident in each case with a slightly varying elevational direction, but in each case strictly exactly in the azimuthal direction of the optical axis are imaged), and/or a look-up table, from which an assigned laser beam azimuthal direction value is stored directly for respective image positions.

Depending on which parameters are respectively stored, then in each case for the translation of the determined image position L'C into a laser beam azimuthal direction value a distance ΔX can be ascertained which is present in the image between the image position L'C and the imaging position A' of the optical axis in that direction which is assumed as direction or is stored in the calibration parameters and which represents an offset direction—brought about hypothetically by a pure azimuthal direction deviation from the optical axis—of a laser beam impingement position on the image sensor, and said distance ΔX—in particular in accordance with a translation factor defined by the objective imaging ratio—can be translated into the laser beam azimuthal direction value, (this option is shown here in FIG. 6), or a distance can be ascertained which is present in the image between the image position and the zero azimuthal deviation line, and said distance—in particular in accordance with a translation factor defined by the objective imaging ratio—can be translated into the laser beam azimuthal direction value, or the laser beam azimuthal direction value assigned to the determined image position in the look-up table can be read out.

For all cases, the laser beam azimuthal direction value (that is to say as value for a relative azimuthal direction, i.e. an azimuthal direction of the incident laser beam relative to the direction of the optical axis) can be output here for example as relative azimuth angle of the laser beam (e.g. in degrees/minutes/seconds).

Figure 7:
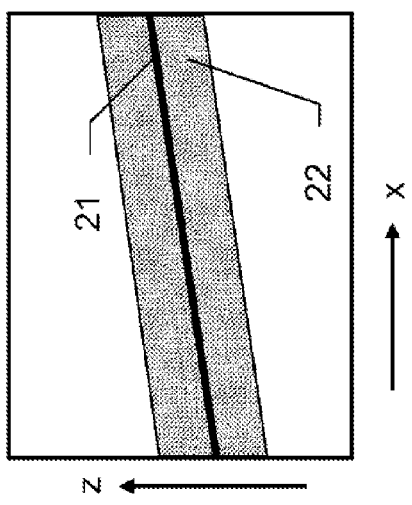
FIG. 7 shows one example of the detection of horizontality deviations of a rotating laser beam or rotating laser beam fan.
Figure 8:
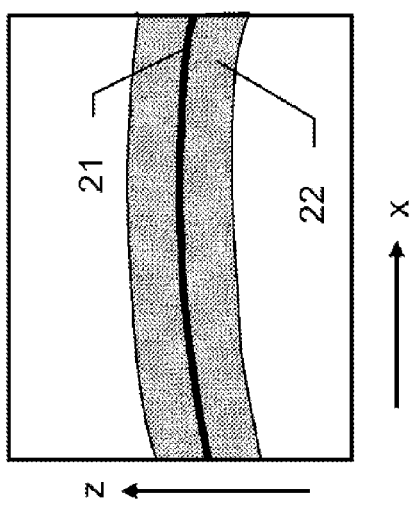
FIG. 8 shows a further example of the detection of horizontality deviations of a rotating laser beam or rotating laser beam fan.

FIGS. 7 and 8 show examples of the detection of deviations of the emission profile of a rotating laser beam or a laser beam fan from the horizontal. In this case, the reference numeral 22 identifies the measured imaging of the reference plane produced by the rotating laser and 21 identifies course and position of the reference plane line determined therefor, over a certain azimuthal angle range X. The profile in accordance with FIG. 7 indicates the presence of a deviation of the reference plane from the horizontal in accordance with an oblique position or inclination relative to a horizontal plane. This may correspond to an error to be corrected in the adjustment of the laser, but may also correspond to a deliberately obliquely spanned reference plane. In this case, the laser beam horizontal trueness testing device according to the invention—by evaluation of the projection line generated by the rotating laser beam on the image sensor—can be used e.g. for testing the plane trueness of the inclined reference plane and, if appropriate, readjustment thereof to a desired setpoint value (wherein for this purpose—as explained in greater detail in association with FIGS. 9a, 9b and 10—an image capture can advantageously be carried out at a plurality of locations of the laser plane).

The profile in accordance with FIG. 8 can indicate the presence e.g. of a so-called saddle error, that is to say that the laser beam does not rotate precisely in a plane, rather the inclination of the laser beam changes at a specific rotation position and then reverts to an initial value. It is thus likewise possible to diagnose misalignments of the laser beam, with potentially even possible conclusions about underlying causes of errors. The profile in accordance with FIG. 8 corresponds to a rather unlikely situation in practice where the laser beam projection apparatus and the telescope are aligned exactly with respect to one another such that the rotation position which corresponds to the saddle vertex occurs approximately in the center of the azimuthal angle range detected by the image sensor.

Figure 10A:
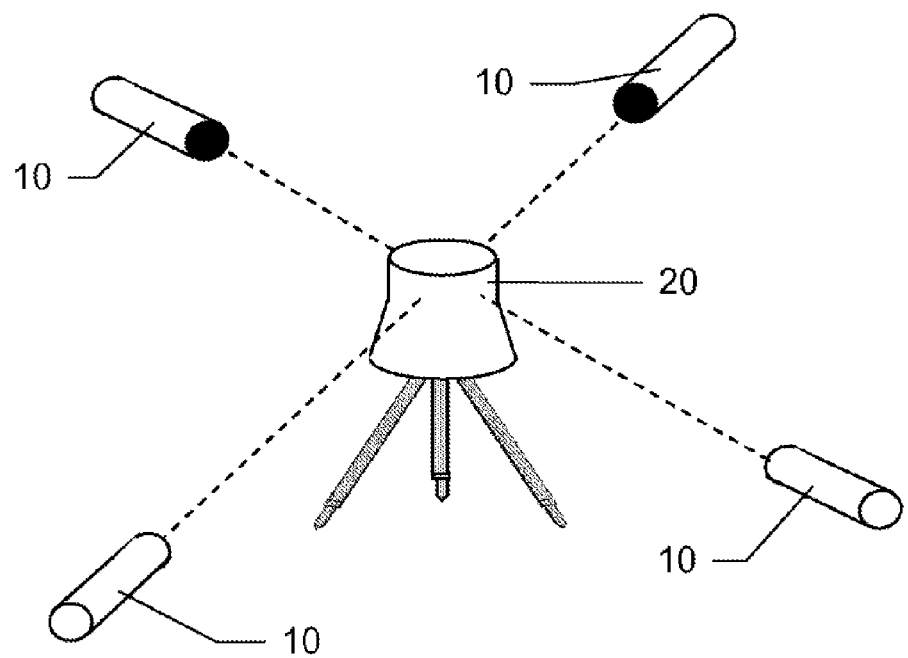
Figure 10B:
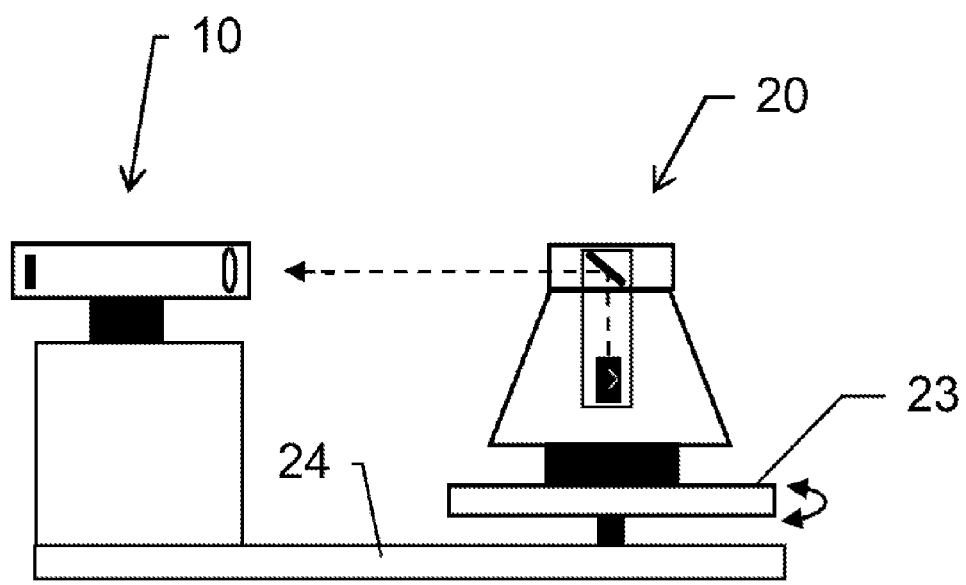

For the systematic, targeted determination of a plane error or saddle error, a procedure illustrated with reference to FIGS. 10a, 10b and 11 is preferable in practice.

Figure 9:
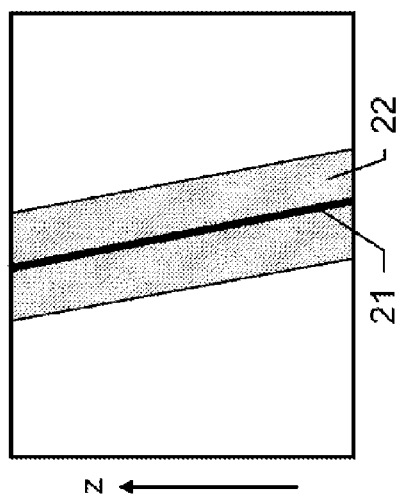
FIG. 9 shows one example of the detection of verticality deviations of a plane produced by a rotation laser in the lay-down position or a vertical laser beam fan, FIGS. 10a-b in each case show an example of the measurement of the horizontal trueness of a laser beam projection apparatus.

As evident with reference to FIG. 9, the device according to the invention can also be used to check whether a plane which is spanned in a desired vertical fashion and is generated by a laser beam projection apparatus is indeed actually truly vertical.

For this purpose, the laser beam horizontal trueness testing device according to the invention can additionally have a functionality for testing a plane verticality trueness. This is especially applicable to those specific laser beam projection apparatuses which are suitable for spanning a vertical plane by means of the emitted laser beam. By way of example, this may be a rotation laser having lay-down position functionality which—in a manner known per se to the person skilled in the art—in a lay-down position is designed for emitting the laser beam in a manner rotating about a horizontal axis and thus for generating a vertical plane, wherein the vertical setting of the plane can be carried out in this case automatically by the rotation laser and a self-verticalizing mechanism provided in an integrated manner in the rotation laser for this purpose.

In this case, a line laser designed for emitting a vertically fanned-out laser beam may also be appropriate as another example of such a laser beam projection apparatus to be tested.

In the context of the functionality for testing the plane verticality trueness, in this case once again a capture—carried out by the image sensor—of an image from the laser beam incident in the objective can be triggerable (or automatically triggered) and the evaluation unit can automatically carry out:

a determination of image position information about an imaging 22—generated in the image by the detected laser beam—from the reference plane by image processing, in particular wherein a position and a course of a plane line 21 defined by the laser beam in the image are determined as image position information on the basis of a processing of the imaging 22, and a quantification of the verticality trueness depending on the determined image position information and depending on the stored calibration parameters, in particular by comparison of the course of the plane line 21 with a direction Z in the image which represents an offset direction—brought about hypothetically by a pure elevational direction deviation from the optical axis—of a laser beam impingement position on the image sensor.

A pure (left-right) offset of the plane line 21 that can be determined in the image from an image center may be irrelevant here to this functionality. What is essential to the evaluation in the context of this functionality here is whether the course of the plane line 21 (i.e. the direction of the course of the line in the image) is implemented parallel to the calibrated direction Z (wherein verticality can be confirmed for this case), and, if not, by how much the direction of the course of the plane line 21 in the image differs from the direction Z (which can then be translated into an (angle) value for the deviation from verticality).

FIG. 10a illustrates a measurement of the horizontal trueness of the laser beam projection apparatus 20 by means of the positioning of a laser beam horizontal trueness testing device 10 according to the invention at four different positions in the surrounding area of the laser beam projection apparatus 20. Alternatively, as shown in FIG. 10b, the laser beam horizontal trueness testing device 10 can be arranged in a stationary manner, for example on a platform 24, and the laser beam projection apparatus 20 to be tested can be mounted rotatably relative to the device 10 on a rotatable platform and for example thus jointly on the same platform as the laser beam horizontal trueness testing device 10. This advantageously makes it possible to measure the horizontal and/or plane trueness of the light emission by the laser beam projection apparatus 20 continuously over a complete solid angle range of 360° of the relative orientation of laser beam horizontal trueness testing device 10 and laser beam projection apparatus 20 with respect to one another (or at points e.g. in eight or sixteen different angular positions).

FIG. 11 illustrates possible measurement results, produced with the aid of the arrangement illustrated in FIG. 10a or FIG. 10b, for a mutual positioning of the laser beam horizontal trueness testing device and the laser beam projection apparatus with respect to one another at angles of 0°, 90°, 180° and 270°. In this context, as indicated here, in each case both the central position L'C of the laser beam and the course 21 of the reference plane 22 that is produced over the azimuthal angle range respectively detected can be measured and evaluated. The situation illustrated here, with a maximum (with regard to the Z-direction) of the laser beam impingement position L'C at 0°, a minimum at 180° and a continuously oblique course in the angle range therebetween (at 90° and 270°), indicates e.g. the presence of a plane error (that is to say an undesired slight inclination of the produced plane relative to a strictly horizontal plane), which can be determined in particular from the aggregation of the information from the four individual images.

These figures last described illustrate one embodiment of a laser beam horizontal trueness testing device according to the invention which has a functionality for testing a plane trueness especially for a laser beam projection apparatus which is designed in this way and which is designed for spanning a reference plane with the laser beam, in particular for a laser beam projection apparatus designed as a laser-fan-emitting line laser or rotation laser. In this case, in the context of the functionality for testing the plane trueness a capture—carried out by the image sensor—of an image from the laser beam incident in the objective is triggerable and the evaluation unit automatically carries out the following steps:

a determination of image position information about an imaging 22—generated in the image by the detected laser beam—from the reference plane by image processing, in particular wherein a position and a course of a reference plane line 21 defined by the laser beam in the image are determined as image position information on the basis of a processing of the imaging, and a quantification of the plane trueness depending on the determined image position information and depending on the stored calibration parameters.

Additionally or alternatively, at different reference plane locations the image sensor can capture images from the laser beam incident in the objective at the respective reference plane locations and the evaluation unit then automatically carries out:

a determination of a respective image position L'C of the respectively captured laser beam for the respective plurality of images, and a quantification of the plane trueness by aggregation of the respective determined image positions, in particular taking into consideration the respective reference plane locations at which the respective images are captured, and depending on the stored calibration parameters.

FIG. 12a shows an example of a quantitative measurement result for a measurement of a rotating laser with a laser beam horizontal trueness testing device according to the invention. FIG. 12b illustrates an enlarged excerpt therefrom. The laser beam 11a is imaged in the region of the x-z-coordinate axes. An offset in the z-direction can be discerned. An enlargement, as depicted in FIG. 12b, additionally reveals that the laser beam does not run totally horizontally, but rather has a deviation from the horizontal, the extent of which can be established by means of a linear fit 11b. Furthermore, the laser beam horizontal trueness testing device according to the invention also makes it possible to diagnose small deviations from linearity which are manifested e.g. in a local maximum 11c.

Figure 13A:
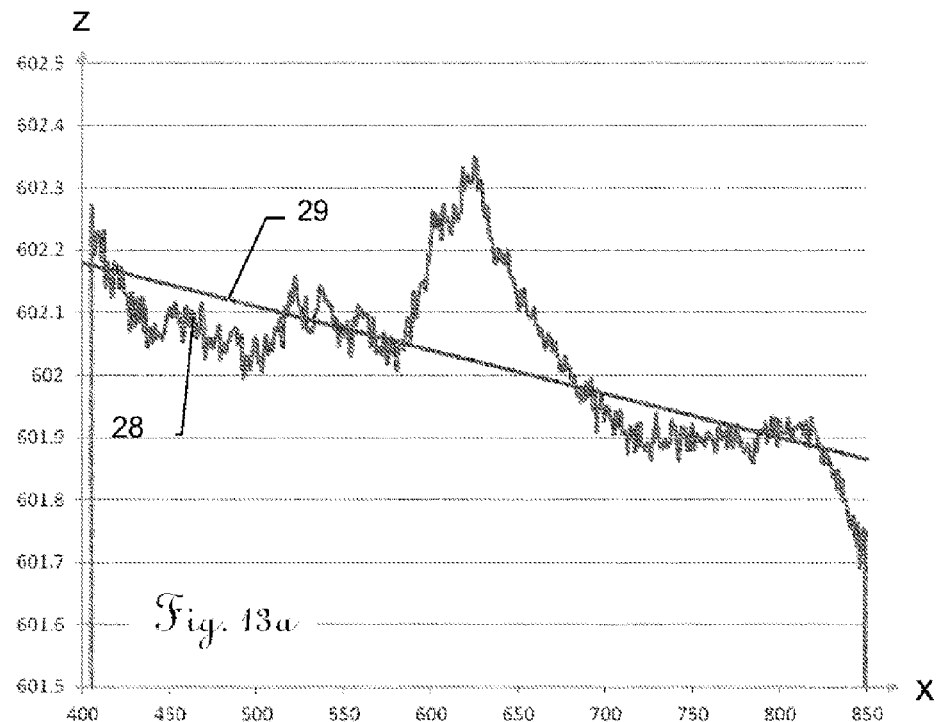
Figure 13B:
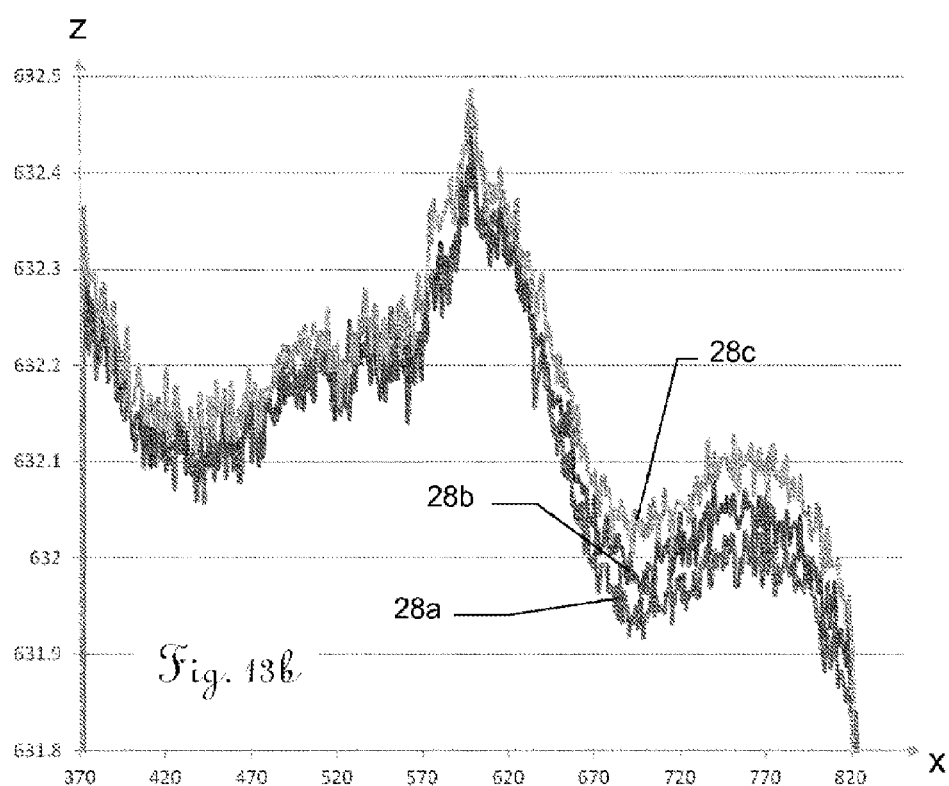

FIGS. 13a and 13b show real, quantitative results for the measurement of a rotating laser with a laser beam horizontal trueness testing device according to the invention, with the height Z of the imaging of the laser beam on the image sensor as a function of the azimuth angle range X swept over. The scaling of the axes X and Z is in values of pixels of the image sensor, wherein a pixel corresponds to an azimuthal angle range of 6.5 arcseconds. The range illustrated in the X-direction in FIG. 12a therefore corresponds to an azimuthal angle range of 2835 arcseconds, and in this case the image sensor detected measurement values in a Z-range of between 601.7 and 602.4 pixels, corresponding to a range of 4.4 arcseconds. In this case, the exposure time of the image sensor should correspond e.g. to a full revolution of the rotating laser beam. The very high resolution of the measuring arrangement according to the invention is noticeable. The rapidly oscillating line 28 represents the profile of the current measurement values for the respective inclination value (or the respective horizontality deviation) of the incident laser beam as a function of the azimuthal angle, and the solid line 29 represents a linear fit, for example according to the total least squares method, of these measurement values.

Firstly, in this case a slight negative gradient of the measurement curve from low X-pixel values in the direction of higher X-pixel values can be read, which corresponds to a locally decreasing inclination deviation of the respectively incident laser beam from the horizontal and thus—considered globally or over a large part or even the entire circumference—can indicate either a saddle error or a plane error.

From experience, a saddle error leads to a deviation of typically 10 to 20 arcseconds, considered over a wider angle range of e.g. 90-180°.

Secondly, a pronounced elevation is noticeable at approximately 600 pixels in the X-direction, which corresponds to an abrupt elevational direction deviation from the fitted base line amounting to—when converted—approximately 2 arcseconds.

With the deviation registered here of approximately 2 arcseconds from a linear profile, the presence of a more minor disturbance, for example a mounting error of the rotating deflection element of the rotation laser, can be diagnosed with greater probability.

FIG. 13b illustrates the reproducibility of the measurement results, captured again in each case by the exposure of the image sensor during a full revolution time of the rotation laser. The illustration shows the profile of the measurement results for the 1st revolution (curve 28a), 70th revolution (curve 28b) and 140th revolution (curve 28c). The extraordinarily high reproducibility of the measurement results is noticeable, in particular with regard to fluctuations of a profile corresponding to the horizontal over the azimuthal angle range swept over. With regard to the discernible slight rise or drift of the Z-values, between the 1st revolution and the 140th revolution, it is pointed out that this change amounts to only a maximum of 0.1 pixel corresponding to 0.6 arcsecond.

Particularly the real experimental data from FIGS. 13a and 13b additionally demonstrate that the laser beam horizontal trueness testing device according to the invention is suitable for yielding data with an accuracy in the low subpixel range, i.e. of significantly less than 0.1 pixel.

It goes without saying that these illustrated figures merely schematically illustrate possible exemplary embodiments. The various approaches can likewise be combined with one another and with methods from the prior art.

What is claimed is:

1. A laser beam horizontal trueness testing device for a laser beam projection apparatus having a beam leveling functionality, wherein the laser beam horizontal trueness testing device comprises:
   a telescope having
      an aperture,
      an attenuation filter,
      an objective having a magnifying effect and defining an optical axis, and
      a planar image sensor arranged in an image plane of the objective and serving for capturing an image from a laser beam incident in the objective, wherein a focus is set or settable in such a way that beams running parallel to one another and incident in the objective coincide and are imaged over the entire aperture of the objective at the same point on the image plane and are thus detectable by the image sensor in a single, identical pixel,
   an inherent inclination compensator, and
   an evaluation unit designed for automatically carrying out
      a determination of an image position of the laser beam captured in the image on the basis of image processing and
      a quantification of the laser beam horizontal trueness with a translation of the determined image position into a laser beam inclination value on the basis of a translation rule related to calibration parameters dependent on a position of the image sensor in the telescope.

2. The laser beam horizontal trueness testing device as claimed in claim 1, wherein:
   the attenuation filter is designed in such a way that a multiplicity of different degrees of attenuation are provided, from which
   a respective degree of attenuation is selectable and settable on the part of the user, or
   a degree of attenuation is automatically selected and caused to be set by evaluation of a test image captured from the laser beam incident in the objective,
   wherein
   the attenuation filter is designed in such a way that a respective degree of attenuation is selectable and settable continuously variably in a wide degree-of-attenuation range, wherein the attenuation filter has at least one rotatably arranged linear polarizer, specifically two or more linear polarizers arranged rotatably relative to one another,
   and/or
   the attenuation filter extends substantially uniformly over an entire objective cross-sectional area as aperture.

3. The laser beam horizontal trueness testing device as claimed in claim 1, wherein:
   the telescope is designed in a diaphragm-free fashion, and the image sensor and the objective are arranged in a cooperating fashion in the telescope, in such a way that an incident laser beam is detectable by the image sensor over at least a wide part of the objective cross-sectional area as aperture.

4. The laser beam horizontal trueness testing device as claimed in claim 1, wherein:
   the telescope is designed in a diaphragm-free fashion, and the image sensor and the objective are arranged in a cooperating fashion in the telescope, in such a way that an incident laser beam is detectable by the image sensor over substantially over the entire objective cross-sectional area.

5. The laser beam horizontal trueness testing device as claimed in claim 1, wherein:
   the telescope furthermore has a focusing element disposed downstream of the objective in the beam path,
   and/or
   the inherent inclination compensator is designed
   as an optomechanical self-leveler having an optomechanical element for the self-leveling of the optical axis of the telescope, said optomechanical element being arranged between the objective and the image sensor in the beam path of the telescope,
   or
   as an electronic inclination considerer having a high-precision inclination sensor for ascertaining a telescope inclination value dependent on a current inclination position of the telescope, wherein the telescope inclination value is automatically taken into consideration by the evaluation unit in the automatically conducted translation of the image position into the laser beam inclination value.

6. The laser beam horizontal trueness testing device as claimed in claim 1, wherein the stored calibration parameters represent at least one of:
   an imaging position of the optical axis in the image and, which represents an offset direction brought about hypothetically by a pure horizontality error of a laser beam impingement position on the image sensor, a zero inclination line running substantially horizontally over the entire image region in the image in the image, and a look-up table, from which an assigned laser beam inclination value is stored directly for respective image positions.

7. The laser beam horizontal trueness testing device as claimed in claim 6, wherein:

for the translation a distance is ascertained which is present in the image between the image position and the imaging position in that direction which is assumed as direction or is stored in the calibration parameters and which represents an offset direction brought about hypothetically by a pure horizontality error of a laser beam impingement position on the image sensor, and said distance in accordance with a translation factor defined by the objective imaging ratio is translated into the laser beam inclination value, and/or a distance is ascertained which is present in the image between the image position and the zero inclination line, and said distance in accordance with a translation factor defined by the objective imaging ratio is translated into the laser beam inclination value, and/or the laser beam inclination value assigned to the determined image position in the look-up table is read out, wherein the laser beam inclination value is output as inclination angle of the laser beam.

8. The laser beam horizontal trueness testing device as claimed in claim 1, wherein:

a pattern is in each case stored for different laser beam cross-sectional shapes in a memory retrievably for the evaluation unit, a pattern corresponding to the laser beam cross-sectional shape of the incident laser beam is selectable on the part of the user or is automatically selected by image processing with feature recognition, and by means of the evaluation unit when determining the image position the selected pattern is matched on the basis of a best fit method in the image with the captured laser beam, and on the basis of the matched position of the pattern in the image, the image position of the laser beam captured in the image is ascertained, wherein information is concomitantly stored for each stored pattern, which information allows the derivation of a pattern-internally defined pattern position to be used for the ultimate determination of the image position within the pattern, specifically wherein the information is the pattern-internally defined pattern position itself or a defined pattern position ascertaining algorithm such as a pattern centroid ascertaining algorithm.

9. The laser beam horizontal trueness testing device as claimed in claim 8, wherein the selected pattern is matched with subpixel accuracy; and/or the pattern comprises a stencil.

10. The laser beam horizontal trueness testing device as claimed in claim 1, wherein:

the telescope furthermore has a beam splitter arranged in the beam path and serving for splitting the beam path into a first channel and a second channel in such a way that a first image plane of the objective is produced in the first channel and a second image plane of the objective is produced in the second channel, wherein the image sensor is arranged in the first image plane, and an optical unit carrying an indicator for the optical axis and an eyepiece disposed downstream of said optical unit and serving for a user's eye to view the intermediate image generated in the second image plane are arranged in the second image plane.

11. The laser beam horizontal trueness testing device as claimed in claim 1, wherein:

the optical unit carrying an indicator for the optical axis includes a reticle.

12. The laser beam horizontal trueness testing device as claimed in claim 1, wherein:

the laser beam horizontal trueness testing device additionally has a functionality for testing a laser beam azimuth trueness especially for a laser beam projection apparatus which is designed in this way and which emits a laser beam having a cross section that can be regarded as punctiform in a macro perspective, wherein in the context of the functionality for testing the laser beam azimuth trueness a capture carried out by the image sensor of an image from the laser beam incident in the objective is triggerable and the evaluation unit automatically carries out a determination of an image position of the laser beam captured in the image, and a quantification of the laser beam azimuth trueness with a translation of the determined image position into a laser beam azimuthal direction value on the basis of a translation rule dependent on the stored calibration parameters, wherein the stored calibration parameters represent at least one of:

an imaging position of the optical axis in the image, which represents an offset direction brought about hypothetically by a pure azimuthal direction deviation from the optical axis of a laser beam impingement position on the image sensor, a zero azimuthal deviation line running substantially vertically over the entire image region in the image in the image, and a look-up table, from which an assigned laser beam azimuthal direction value is stored directly for respective image positions; and for the translation at least one of:

a distance is ascertained which is present in the image between the image position and the imaging position in that direction which is assumed as direction or is stored in the calibration parameters and which represents an offset direction brought about hypothetically by a pure azimuthal direction deviation from the optical axis of a laser beam impingement position on the image sensor, and said distance in accordance with a translation factor defined by the objective imaging ratio is translated into the laser beam azimuthal direction value;

a distance is ascertained which is present in the image between the image position and the zero azimuthal deviation line, and said distance in accordance with a translation factor defined by the objective imaging ratio is translated into the laser beam azimuthal direction value; and/or the laser beam azimuthal direction value assigned to the determined image position in the look-up table is read out, wherein the laser beam azimuthal direction value is output as angle of the laser beam.

13. The laser beam horizontal trueness testing device as claimed in claim 1, wherein:

the laser beam horizontal trueness testing device additionally has a functionality for testing a laser beam inclination trueness especially for a laser beam projection apparatus which is designed in this way and which has a beam inclination function with desired inclination for the laser beam, said desired inclination being selectable in a defined manner on the part of the user and settable optionally automatically, wherein in the context of the functionality for testing the laser beam inclination trueness, after the setting of the defined desired inclination for the laser beam at the laser beam projection apparatus, a capture carried out by the image sensor of an image from the laser beam incident in the objective is triggerable and the evaluation unit automatically carries out a determination of an image position of the laser beam captured in the image, and a quantification of the laser beam inclination trueness with a translation of the determined image position into a laser beam inclination value on the basis of a translation rule dependent on the stored calibration parameters, such that the laser beam inclination value obtained in this case is comparable with the desired inclination set in a defined manner at the laser beam projection apparatus.

14. The laser beam horizontal trueness testing device as claimed in claim 1, wherein:

the evaluation unit is designed as a control and evaluation unit and a functionality for testing the laser beam horizontal trueness is provided, said functionality proceeding totally automatically after triggering, in the context of which, under the control of the control and evaluation unit, a capture carried out by the image sensor of an image from the laser beam incident in the objective is automatically initiated and carrying out the determination and the quantification is subsequently started automatically, wherein the functionalities for testing the laser beam azimuth trueness and respectively the laser beam inclination trueness are also provided as functionalities proceeding totally automatically after triggering and in this case, under the control of the control and evaluation unit, a capture carried out by the image sensor of an image from the laser beam incident in the objective is automatically initiated and carrying out the determination and the quantification is subsequently started automatically.

15. The laser beam horizontal trueness testing device as claimed in claim 1, wherein:

the laser beam horizontal trueness testing device additionally has a functionality for testing a plane trueness especially for a laser beam projection apparatus which is designed in this way and which is designed for spanning a reference plane with the laser beam, wherein in the context of the functionality for testing the plane trueness a capture carried out by the image sensor of an image from the laser beam incident in the objective is triggerable and the evaluation unit automatically carries out a determination of image position information about an imaging generated in the image by the detected laser beam from the reference plane by image processing, wherein a position and a course of a reference plane line defined by the laser beam in the image are determined as image position information on the basis of a processing of the imaging, and a quantification of the plane trueness depending on the determined image position information and depending on the stored calibration parameters, and/or at different reference plane locations the image sensor can capture images from the laser beam incident in each case in the objective at the respective reference plane locations and the evaluation unit automatically carries out a determination of a respective image position of the respectively captured laser beam for the respective plurality of images, and a quantification of the plane trueness by aggregation of the respective determined image positions.

16. The laser beam horizontal trueness testing device as claimed in claim 1, wherein:

the quantification of the plane trueness comprises taking into consideration the respective reference plane locations at which the respective images are captured, and depending on the stored calibration parameters.

17. The laser beam horizontal trueness testing device as claimed in claim 1, wherein:

the laser beam horizontal trueness testing device additionally has a functionality for testing a plane verticality trueness especially for a laser beam projection apparatus which is designed in this way and which is suitable for spanning a vertical plane by means of the emitted laser beam, wherein in the context of the functionality for testing the plane verticality trueness a capture carried out by the image sensor of an image from the laser beam incident in the objective is triggerable and the evaluation unit automatically carries out a determination of image position information about an imaging generated in the image by the detected laser beam from the reference plane by image processing, wherein a position and a course of a plane line defined by the laser beam in the image are determined as image position information on the basis of a processing of the imaging, and a quantification of the verticality trueness depending on the determined image position information and depending on the stored calibration parameters.

18. The laser beam horizontal trueness testing device as claimed in claim 1, wherein:

the quantification of the vertical trueness comprises a comparison of the course of the plane line with a direction in the image which represents an offset direction brought about hypothetically by a pure elevational direction deviation from the optical axis of a laser beam impingement position on the image sensor.

19. A system comprising a laser beam horizontal trueness testing device as claimed in claim 1 and a laser beam projection apparatus having a beam self-leveling functionality for construction and/or interior finishing work, wherein the laser beam horizontal trueness testing device and the laser beam projection apparatus in each case comprise a data communication interface, and wherein the laser beam horizontal trueness testing device is designed for generating data dependent on the laser beam inclination value and for communicating said data to the laser beam projection apparatus, such that the beam leveling functionality, wherein the laser beam projection apparatus is designed for self-acting automatic recalibration of its beam leveling functionality.

20. A method for testing the laser beam horizontal trueness of a laser beam projection apparatus having a beam self-leveling functionality and designed for construction and/or interior finishing work, wherein the method is carried out by a telescope comprising an aperture, an attenuation filter, an objective having a magnifying effect, and a planar image sensor arranged in an image plane of the objective and serving for detecting an image from a laser beam incident in the objective, wherein a focus is set or settable in such a way that beams running parallel to one another and incident in the objective coincide and are imaged over the entire aperture of the objective at the same point on the image plane and are thus detectable by the image sensor in a single, identical pixel, and wherein the method involves compensating for an inclination of the telescope, capturing an image from a laser beam incident in the objective, determining an image position of the laser beam captured in the image on the basis of image processing, and quantifying the laser beam horizontal trueness by means of translating the determined image position into a laser beam inclination value on the basis of a translation rule related to calibration parameters dependent on a position of the image sensor in the telescope.

\* \* \* \* \*